Figure 1:
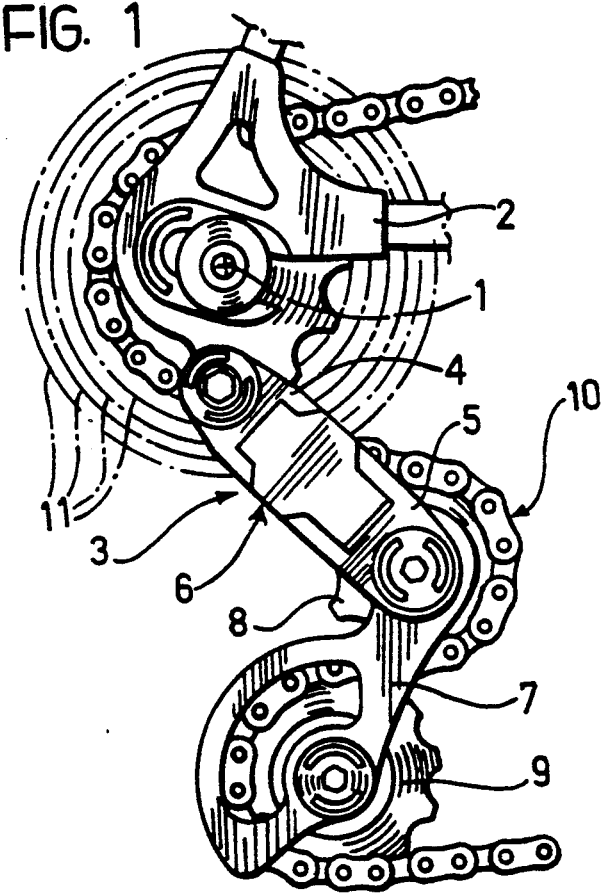

United States Patent [19]

Romano

[11] Patent Number: 5,066,264

[45] Date of Patent: Nov. 19, 1991

[54] GEAR FOR BICYCLES AND A FREEWHEEL FOR BICYCLES INCLUDING A PLURALITY OF SUCH GEARS

[75] Inventor: Antonio Romano, Padua, Italy

[73] Assignee: Campagnolo Srl, Vicenza, Italy

[21] Appl. No.: 616,967

[22] Filed: Nov. 21, 1990

[30] Foreign Application Priority Data

Nov. 21, 1989 [IT] Italy .................. 68028 A/89

[51] Int. Cl.⁵ .............................................. F16H 7/00
[52] U.S. Cl. ........................................ 474/152; 474/80
[58] Field of Search ............ 474/152, 155, 160, 77–80

[56] References Cited

U.S. PATENT DOCUMENTS

| | | | |
|---|---|---|---|
| 3,661,021 | 5/1972 | Ohshita | 474/80 |
| 3,956,943 | 5/1976 | Yamasaki | 474/160 X |
| 3,964,330 | 6/1976 | Ozaki | 474/80 |
| 4,612,004 | 9/1986 | Nagano | 474/80 |
| 4,813,916 | 3/1989 | Valin | 474/152 |

Primary Examiner—Thuy M. Bui
Attorney, Agent, or Firm—Sughrue, Mion, Zinn Macpeak & Seas

[57] ABSTRACT

A freewheel for bicycles has a plurality of gears each of which, with the exception of the one with the smallest diameter, has teeth arranged in successive sets of three constituted each by teeth of three different types. A first type of tooth has a face which is recessed relative to the corresponding flat face of the gear. A second type of tooth has a groove formed in the top surface of the tooth and extending circumferentially of the gear. A third type of tooth has a top chamfer on its face situated on the side opposite the recessed face of the first tooth.

6 Claims, 3 Drawing Sheets

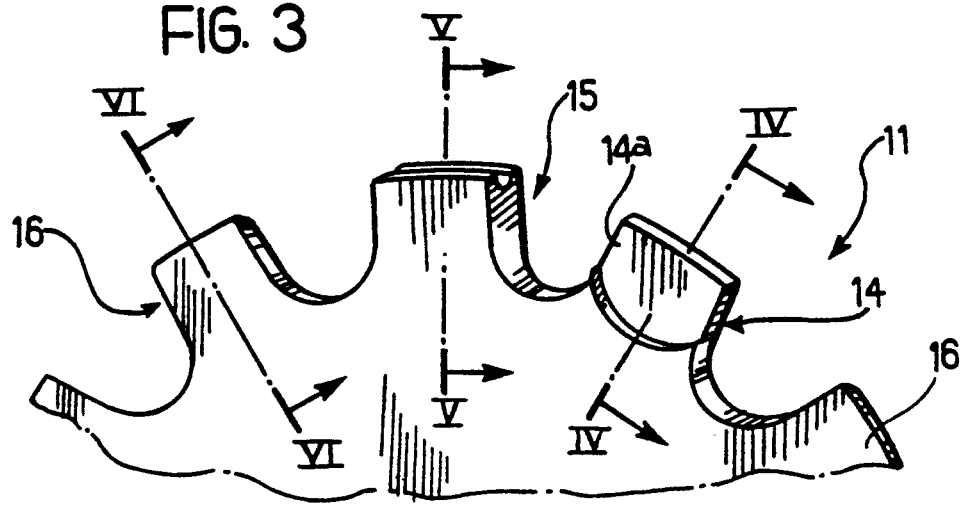
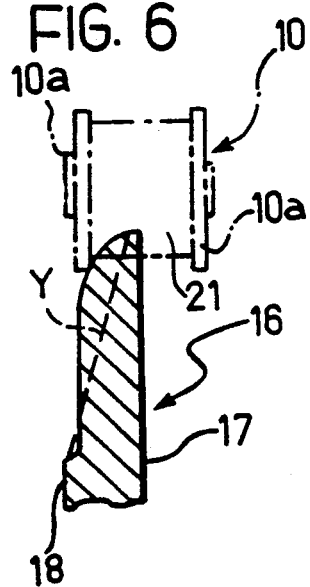
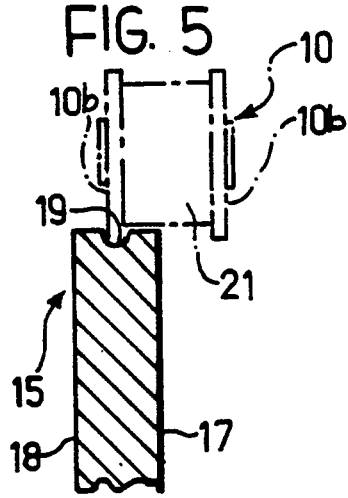
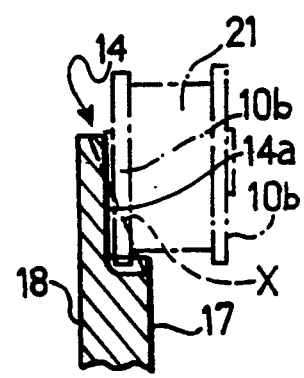
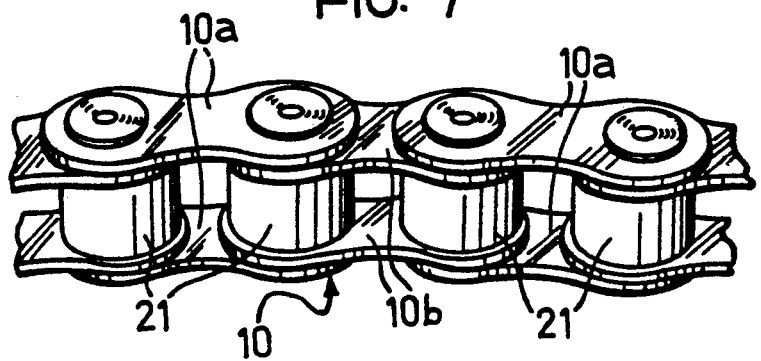

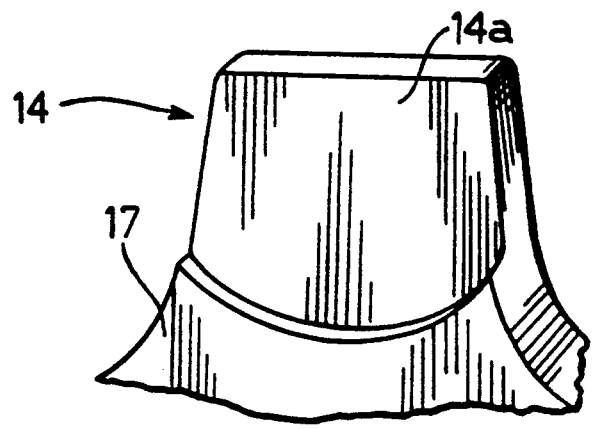
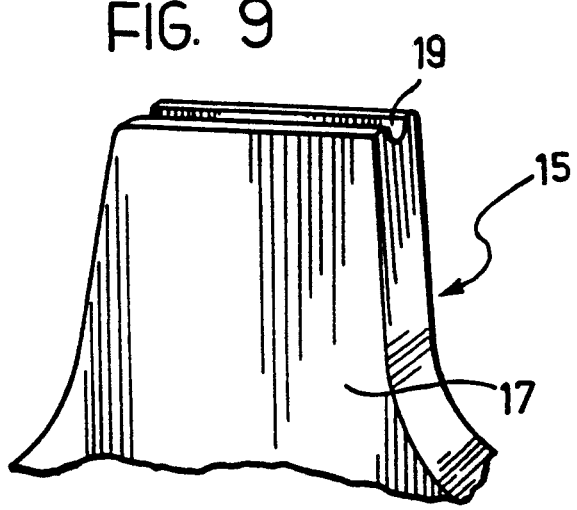
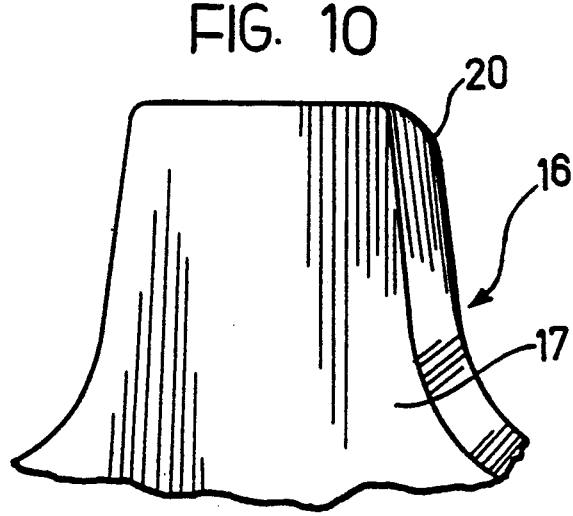

GEAR FOR BICYCLES AND A FREEWHEEL FOR BICYCLES INCLUDING A PLURALITY OF SUCH GEARS

DESCRIPTION

The present invention relates to gears for bicycles. In bicycles with gears, the freewheel associated with the rear wheel hub has a plurality of gears or sprockets which are intended to engage the bicycle chain selectively, the chain being engaged on a particular sprocket by a derailleur device carried by the bicycle frame near the rear wheel hub.

The derailleurs currently in use enable reliable derailling when the chain is moved from a sprocket of a certain diameter to a smaller-diameter sprocket. The derailling operation may be rather more difficult and/or time-consuming, however, when the chain has to move onto a larger-diameter sprocket, particularly if the cyclist tensions the chain by exerting a force on the pedals. This problem is due to the fact that the tensioning of the chain makes it more difficult to regain the length of that part of the chain which is needed to pass around the larger-diameter sprocket.

The object of the present invention is to ensure the efficient and reliable operation of the derailleur even towards the larger-diameter sprockets and even when the chain is tensioned as a result of a force exerted on the pedals.

In order to achieve this object, the subject of the invention is a gear intended to mesh with a bicycle chain as a result of the operation of a derailleur device associated with the chain, characterised in that the teeth of the gear are in successive sets of three constituted each by teeth of the following three types arranged in succession in the opposite sense from that in which the gear usually rotates when the bicycle is in use:

a) a first tooth with a recessed surface portion in one of its faces, b) a second tooth with a groove formed in the top surface of the tooth and extending circumferentially of the gear;

c) a third tooth with a top chamfer on its face which is on the side opposite the recessed face of the first tooth.

When the invention is applied to the sprockets associated with the freewheel of a bicycle, each of the sprockets, except the one with the smallest diameter, is formed with the structure and arrangement described above, the recessed faces of the teeth of the first type facing towards the smaller-diameter sprockets.

The invention can be applied equally well, however, to the gears associated with the bottom bracket of the bicycle.

When the chain is derailled onto a larger-diameter gear, the shapes of the teeth described above ensure that the links of the chain engage the teeth quickly and reliably.

In particular, the presence of the recessed surface portion on the first type of tooth enables the link of the chain which is coming into contact with that portion at the start of the derailling operation to be positioned nearer its final position of engagement on the larger-diameter gear. The grooves in the teeth of the second type are engaged by the side plates which constitute the links of the chain and thus provide a support for the chain itself as it is "climbing" onto the larger-diameter gear. Finally, the top chamfers on the teeth of the third type facilitate the final movement of the links of the chain towards the positions in which they are engaged correctly on the gear.

Figure 2:
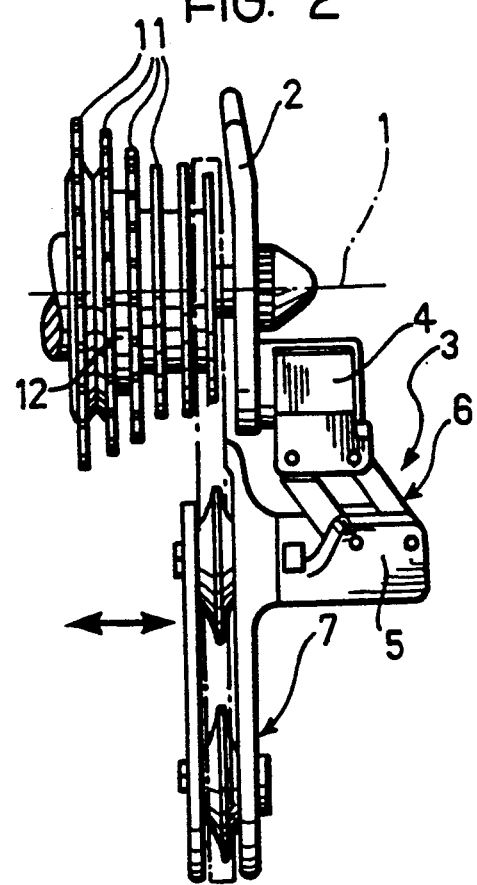

Further characteristics and advantages of the present invention will become clear from the description which follows with reference to the appended drawings, provided by way of non-limiting example, in which:

FIGS. 1 and 2 a side view and a rear view of the rear wheel hub of a bicycle, with the respective set of sprockets and the derailleur associated therewith, FIG. 3 is a partial view of a gear according to the invention, on an enlarged scale, FIGS. 4, 5 and 6 are sections taken on the lines IV, V and VI of FIG. 3, FIG. 7 shows a portion of the bicycle chain, and FIGS. 8, 9 and 10 are perspective views of three types of teeth with which the gear according to the invention is provided.

FIGS. 1 and 2 show the spindle, indicated 1, of the rear wheel of a bicycle having a frame 2 which supports a derailleur 3 near the spindle 1. For the purposes of the present invention, the derailleur 3 may be of any known type, the structure of the derailleur being outside the scope of the present invention. For this reason, the structural details of the derailleur are not described in detail in the present description.

With reference to the particular embodiment illustrated, the derailleur 3 comprises an upper body 4 fixed to the frame 2 and a lower body 5 connected to the upper body 4 by an articulated parallelogram 6 and carrying a chain-tensioning rocker arm 7 with two return wheels 8, 9 for the bicycle chain 10. The derailleur 3 controls the selective engagement of the chain with a plurality of sprockets 11 carried by the body 12 of the usual freewheel associated with the hub of the rear wheel of the bicycle. According to a well-known technique, the derailleur 3 is biassed by resilient means (not shown) towards the position illustrated in FIG. 2, in which the wheels 8 and 9 cause the chain 10 to engage the smallest-diameter sprocket 11. The rocker arm 7 of the derailleur can be moved to the left (with reference to FIG. 2) by means of a flexible-cable control transmission so as to cause the chain to engage the larger-diameter sprockets.

According to the present invention, each of the sprockets 11, except the one of smallest diameter, is formed in the manner shown in detail in FIGS. 3–5 and 7–9.

More precisely, the teeth of the sprockets 11 are provided in successive sets of three each including teeth of three different types 14, 15 and 16 arranged in succession in the opposite sense from that in which the sprocket 11 rotates when, during use of the bicycle, the cranks are rotated in the sense corresponding to the forward movement of the bicycle.

In the embodiment illustrated, each gear 11 is constituted by a single metal plate with two opposite flat faces 17 and 18. Each tooth 14 has a flat, recessed surface portion 14a in the face 17 which faces the smaller-diameter sprockets. Each tooth 15 has a groove 19 in its top surface, extending circumferentially of the gear. Finally, each tooth 16 of the third type has a top chamfer 20 with a curved profile on the face opposite that which faces the smaller-diameter sprockets.

Assuming that the derailleur is operated to cause the chain to be derailled from a smaller-diameter sprocket to the sprocket 11 shown in FIGS. 3–9, the side of a link of the chain will come into contact with the recessed portion 14a of a tooth 14 so that the adjacent portion of the chain can be inclined to the plane in which the gear 11 lies in order to facilitate the engagement of the adjacent links of the chain with the teeth of the gear 11. As can be seen in FIG. 7, the chain 10 has a plurality of rollers 20 interconnected by pairs of link plates 10a, 10b. During the derailling operation, one of the link plates 10a, 10b becomes engaged in a groove 19 of a tooth 15 (FIG. 5) so as to gain a purchase as the chain climbs over the sprocket 11. Immediately afterwards, one of the link plates 10a, 10b will engage the top chamfer 20 of a tooth 16 which will guide the chain 10 in its final movement to the position in which it is correctly engaged on the sprocket 11.

By virtue of this characteristic, the chain is engaged on a larger-diameter sprocket safely and reliably, even when the chain is under tension as a result of a force exerted on the pedals.

In FIG. 4, dotted line X indicates a variant, wherein tooth 14 has a recessed face 14a having a rectilinear profile inclined relative to a plane orthogonal to the gear axis. This solution ensures a high strength of the tooth. Similarly, in FIG. 6, profile Y refers to a variant with a chamfer having an inclined rectilinear profile.

Naturally, the principle of the invention remaining the same, the forms of embodiment and details of construction may be varied widely with respect to those described and illustrated purely by way of example, without thereby departing from the scope of the present invention.

I claim:

1. A bicycle gear which is intended to mesh with a bicycle chain (10) as a result of the operation of a derailleur device (3) associated with the chain (10). wherein the teeth of the gear are in successive sets of three constituted each by teeth of the following three types arranged in succession in the opposite sense from that in which the gear usually rotates when the bicycle is in use:
    a) a first tooth (14) with a recessed surface portion in one of its faces,
    b) a second tooth (15) with a groove (19) formed in a top surface of the tooth and extending circumferentially of the gear,
    c) a third tooth (16) with a top chamfer (20) on its face which is on a side opposite the recessed surface portion of the first tooth (14).

2. A bicycle gear according to claim 1, wherein the recessed surface portion of said first tooth (14) is a flat surface orthogonal to a gear axis.

3. A bicycle gear according to claim 1, wherein the recessed surface portion of said first tooth (14) has a profile which is inclined relative to a plane orthogonal to a gear axis, so as to define a tooth of decreasing thickness towards its tip.

4. A bicycle gear according to claim 1, wherein said top chamfer (20) of said third tooth (16) has a convex curved profile.

5. A bicycle gear according to claim 1, wherein said top chamfer of said third tooth (16) has a rectilinear profile.

6. A freewheel for a bicycle provided with a plurality of sprockets of different diameters side by side, wherein each of the sprockets except the one of smallest diameter, is formed according to claim 1.

* * * * *